(12) United States Patent
Fischer

(10) Patent No.: US 8,165,166 B2
(45) Date of Patent: Apr. 24, 2012

(54) DISCONTINUOUS RECEPTION OPERATION FOR CONSTANT DATA RATE SERVICE

(75) Inventor: Patrick Fischer, Paris (FR)

(73) Assignee: LG Electronics Inc., Seoul (KR)

(*) Notice: Subject to any disclaimer, the term of this patent is extended or adjusted under 35 U.S.C. 154(b) by 174 days.

(21) Appl. No.: 12/051,234

(22) Filed: Mar. 19, 2008

(65) Prior Publication Data

US 2008/0232404 A1 Sep. 25, 2008

Related U.S. Application Data

(60) Provisional application No. 60/895,702, filed on Mar. 19, 2007.

(51) Int. Cl.
*H04J 3/00* (2006.01)
(52) U.S. Cl. ........ 370/498; 370/312; 370/342; 370/432; 455/426.1; 455/522
(58) Field of Classification Search .......... 370/432, 370/498, 312, 328, 318; 455/522, 426.1
See application file for complete search history.

(56) References Cited

U.S. PATENT DOCUMENTS

| | | | | |
|---|---|---|---|---|
| 2004/0227618 | A1* | 11/2004 | Hwang et al. | 340/7.46 |
| 2004/0229605 | A1* | 11/2004 | Hwang et al. | 455/426.1 |
| 2005/0075124 | A1* | 4/2005 | Willenegger et al. | 455/522 |
| 2005/0157759 | A1 | 7/2005 | Ohno et al. | |
| 2005/0190712 | A1* | 9/2005 | Lee et al. | 370/312 |
| 2005/0249141 | A1 | 11/2005 | Lee et al. | |
| 2005/0272459 | A1* | 12/2005 | Lee et al. | 455/522 |
| 2006/0062237 | A1* | 3/2006 | Kim | 370/432 |
| 2006/0067353 | A1* | 3/2006 | Pekonen et al. | 370/432 |
| 2006/0146858 | A1* | 7/2006 | Kim | 370/432 |
| 2006/0251099 | A1* | 11/2006 | Kim et al. | 370/432 |
| 2007/0047485 | A1 | 3/2007 | Gorokhov et al. | |

FOREIGN PATENT DOCUMENTS

| | | |
|---|---|---|
| KR | 1020000016550 | 3/2000 |
| TW | 200703984 | 1/2007 |
| WO | 2004/017540 | 2/2004 |
| WO | 2005078962 | 8/2005 |
| WO | 2005109691 | 11/2005 |
| WO | 2006/033521 | 3/2006 |
| WO | 2006088292 | 8/2006 |

OTHER PUBLICATIONS

LG Electronics Inc., "MTCH Discontinuous Transmission and Reception," 3GPP TSG-RAN Working Group 2 #41, R2-040415, Feb. 16, 2004, XP008072116.
IP Wireless, LG Electronics Inc., "MBMS FDD and TDD Physical Layer Improvements," 3GPP RAN 2 #57 bis, R2-071331, Feb. 26, 2007, XP50134280.

* cited by examiner

*Primary Examiner* — Kwang B Yao
*Assistant Examiner* — Vincelas Louis
(74) *Attorney, Agent, or Firm* — Lee, Hong, Degerman, Kang & Waimey

(57) ABSTRACT

The present invention relates to communicating between a network and a mobile terminal in a wireless communication system. The invention includes receiving a channel during a transmission time interval, and determining not to receive a transmission from the network for a predetermined amount of transmission time intervals related to the channel after receiving the channel.

24 Claims, 14 Drawing Sheets

Logical channels mapped onto transport channels, seen from the UE side
PRIOR ART Logical channels mapped onto transport channels, seen from the UTRAN side
PRIOR ART UE State Transitions
PRIOR ART

DISCONTINUOUS RECEPTION OPERATION FOR CONSTANT DATA RATE SERVICE

CROSS-REFERENCE TO RELATED APPLICATIONS

Pursuant to 35 U.S.C. §119, this application claims the benefit of earlier filing date and right of priority to U.S. Provisional Application No. 60/895,702, filed on Mar. 19, 2007, the contents of which are hereby incorporated by reference herein in their entirety.

FIELD OF THE INVENTION

The present invention relates to communicating between a network and a mobile terminal in a wireless communication system, and more particularly, to a discontinuous reception operation for a constant data rate service.

BACKGROUND OF THE INVENTION

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the Iub interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the Iur interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the Gf interface, to the MSC 6 via the GS interface, to the gateway GPRS support node (GGSN) 9 via the GN interface, and to the home subscriber server (HSS) via the GR interface.

The EIR 8 hosts lists of UEs 1 that are allowed to be used on the network. The EIR 8 also hosts lists of UEs 1 that are not allowed to be used on the network.

The MSC 6, which controls the connection for circuit switched (CS) services, is connected towards the media gateway (MGW) 11 via the NB interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the GC interface and to the Internet via the GI interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH) or a shared channel control channel.

The BCCH provides information including information utilized by a terminal to access a system. The PCCH is used by the UTRAN to access a terminal.

For the purposes of a multimedia broadcast/multicast service (MBMS) additional traffic and control channels are introduced in the MBMS standard. The MCCH (MBMS point-to-multipoint control channel) is used for transmission of MBMS control information. The MTCH (MBMS point-to-multipoint traffic channel) is used for transmitting MBMS service data. The MSCH (MBMS Scheduling Channel) is used to transmit scheduling information. The different logical channels that exist are listed in FIG. 3.

The MAC layer is connected to the physical layer by transport channels and can be divided into a MAC-b sub-layer, a MAC-d sub-layer, a MAC-c/sh sub-layer, a MAC-hs sub-layer and a MAC-m sublayer according to the type of transport channel being managed. The MAC-b sub-layer manages a BCH (broadcast channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink the radio access channel (RACH). The MAC-m sublayer may handle the MBMS data.

The possible mapping between the logical channels and the transport channels from a UE perspective is given in FIG. 4. The possible mapping between the logical channels and the transport channels from a UTRAN perspective is given in FIG. 5.

The MAC-d sub-layer manages a dedicated channel (DCH), which is a dedicated transport channel for a specific terminal. The MAC-d sublayer is located in a serving RNC (SRNC) that manages a corresponding terminal. One MAC-d sublayer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). Additionally the RRC handles user mobility within the RAN and additional services, such as location services.

The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods.

The different possibilities that exist for the mapping between the radio bearers and the transport channels for a given UE are not all possible all the time. The UE and UTRAN deduce the possible mapping depending on the UE state and the procedure that the UE and UTRAN are executing. The different states and modes are explained in more detail below, as far as they concern the present invention.

The different transport channels are mapped onto different physical channels. For example, the RACH transport channel is mapped on a given PRACH, the DCH can be mapped on the DPCH, the FACH and the PCH can be mapped on a secondary common control physical channel (S-CCPCH), and the DSCH is mapped on the PDSCH. The configuration of the physical channels is given by RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode.

Because an RRC connection exists for terminals in RRC connected mode, the UTRAN can determine the existence of a particular terminal within the unit of cells. For example, the UTRAN can determine in which cell or set of cells an RRC connected mode terminal is located and to which physical channel the UE is listening. Thus, the terminal can be effectively controlled.

In contrast, the UTRAN cannot determine the existence of a terminal in idle mode. The existence of idle mode terminals can only be determined by the core network to be within a region that is larger than a cell, for example, a location or a routing area. Therefore, the existence of idle mode terminals is determined within large regions, and in order to receive mobile communication services such as voice or data, the idle mode terminal must move or change into the RRC connected mode. The possible transitions between modes and states are shown in FIG. 6.

A UE in RRC connected mode can be in different states, such as CELL_FACH state, CELL_PCH state, CELL_DCH state, or URA_PCH state. Depending on the state, the UE carries out different actions and listens to different channels.

For example, a UE in CELL_DCH state will try to listen to DCH type of transport channels, among others. DCH types of transport channels include DTCH and DCCH transport channels, which can be mapped to a certain DPCH, DPDSCH or other physical channels.

The UE in CELL_FACH state will listen to several FACH transport channels, which are mapped to a certain S-CCPCH. A UE in PCH state will listen to the PICH channel and the PCH channel, which are mapped to a certain S-CCPCH physical channel.

The main system information is sent on the BCCH logical channel which is mapped on a P-CCPCH (primary common control physical channel). Specific system information blocks can be sent on the FACH channel. When the system information is sent on FACH, the UE receives the configuration of the FACH either on the BCCH that is received on P-CCPCH or on a dedicated channel. When system information is sent on the BCCH (i.e., via the P-CCPCH), then in each frame or set of two frames the SFN (system frame number) is sent which is used in order to share the same timing reference between the UE and the Node-B. The P-CCPCH is sent using the same scrambling code as the P-CPICH (primary common pilot channel), which is the primary scrambling code of the cell. The spreading code that is used by the P-CCPCH is of a fixed SF (spreading factor) 256, and the number is one. The UE knows about the primary scrambling code either by information sent from the network on system information of neighboring cells that the UE has read, by messages that the UE has received on the DCCH channel, or by searching for the P-CPICH, which is sent using the fixed SF 256, the spreading code number 0 and which transmits a fixed pattern.

The system information comprises information on neighboring cells, configuration of the RACH and FACH transport channels, and the configuration of MICH and MCCH which are channels that are dedicated channels for the MBMS service.

Each time the UE changes the cell it is camping (in idle mode) or when the UE has selected the cell (in CELL_FACH, CELL_PCH or URA_PCH) state, the UE verifies that it has valid system information. The system information is organized in SIBs (system information blocks), a MIB (master information block) and scheduling blocks. The MIB is sent very frequently and gives timing information of the scheduling blocks and the different SIBs. For SIBs that are linked to a value tag, the MIB also contains information on the last version of a part of the SIBs. SIBs that are not linked to a value tag are linked to an expiration timer. SIBs linked to an expiration timer become invalid and need to be reread if the time of the last reading of the SIB is larger than this timer value. SIBs linked to a value tag are only valid if they have the same value tag as the one broadcast in the MIB. Each block has an area scope of validity (cell, PLMN, equivalent PLMN) which signifies on which cells the SIB is valid. A SIB with area scope "cell" is valid only for the cell in which it has been read. A SIB with area scope "PLMN" is valid in the whole PLMN, a SIB with the area scope "equivalent PLMN" is valid in the whole PLMN and equivalent PLMN.

In general UEs read the system information when they are in idle mode, CELL_FACH state, CELL_PCH state or in URA_PCH state of the cells that they have selected or the cell that they are camping on. In the system information, they receive information on neighboring cells on the same frequency, different frequencies and different RAT (radio access technologies). This allows the UE to know which cells are candidates for cell reselection.

MBMS is introduced in the UMTS standard in the Release 6 of the specification (Rel-6). It describes techniques for optimized transmission of MBMS bearer service including point-to-multipoint transmission, selective combining and transmission mode selection between point-to-multipoint and point-to-point bearers. This is used in order to save radio resources when the same content is sent to multiple users, and enables TV-like services. MBMS data can be split into two categories, control plane information and user plane information. The control plane information contains information on the physical layer configuration, transport channel configuration, radio bearer configuration, ongoing services, counting information, scheduling information, and the like. In order to allow UEs to receive this information, MBMS bearer specific control information for the MBMS is sent to the UEs.

The user plane data of MBMS bearers can be mapped onto dedicated transport channels for a point-to-point service which is sent only to one UE, or on a shared transport channel for point to multipoint service which is transmitted to (and received by) several users at the same time.

Point-to-point transmission is used to transfer MBMS specific control/user plane information, as well as dedicated control/user plane information between the network and a UE in RRC connected mode. It is used for the multicast or the broadcast mode of MBMS. DTCH is used for a UE in CELL_FACH and Cell_DCH. This allows existing mappings to transport channels.

To allow cell resources to be used in an optimized manner, a function called counting has been introduced in MBMS applications. The counting procedure is used to determine how many UEs are interested in the reception of a given service. This is done by using the counting procedure shown in FIG. 7.

For example, a UE that is interested in a certain service receives information of the availability of a MBMS service. The network can inform the UE that it should indicate to the network its interest in the service in the same way such as by transmitting the "access information" on the MCCH channel. A probability factor included in the access information message determines that an interested UE will only respond with a given probability. In order to inform the network that the UE is interested in a given service, the UE will send to the network the RRC connection setup message or the cell update message in the cell that the UE has received the counting information. This message may potentially include an identifier indicating the service that the UE is interested in.

In the case that the network operates on several frequencies, when a UE is camping on one frequency, and a MBMS service is transmitted on a different frequency, a UE may not be aware of the fact that a MBMS service is transmitted in the different frequency. Therefore a frequency convergence procedure allows the UE to receive information in frequency A that indicates in a frequency B that a given service is available.

In general, an MBMS point-to-multipoint Control Channel (MCCH) is a logical channel used for a point-to-multipoint downlink transmission of control plane information between a network and UEs in RRC Connected or Idle Mode. The control plane information on MCCH is MBMS specific and is sent to the UEs in a cell with an activated MBMS service. The MCCH can be sent in the S-CCPCH carrying the DCCH of the UEs in CELL_FACH state, or in a standalone S-CCPCH, or in the same S-CCPCH with MTCH.

The MCCH is mapped to a specific FACH in the S-CCPCH as indicated on the BCCH. In case of soft combining, the MCCH is mapped to a different S-CCPCH (CCTrCH in TDD) than MTCH. Reception of paging has priority over the reception of the MCCH for Idle mode and URA/CELL_PCH UEs. The configuration of the MCCH (modification period, repetition period, etc.) is configured in the system information sent on the BCCH.

In general, an MBMS point-to-multipoint Traffic Channel (MTCH) is a logical channel used for a point-to-multipoint downlink transmission of user plane information between a network and UEs in RRC Connected or Idle Mode. The user plane information on MTCH is MBMS Service specific and is sent to the UEs in a cell with an activated MBMS service. The MTCH is mapped to a specific FACH in the S-CCPCH as indicated on the MCCH.

In general, an MBMS point-to-multipoint Scheduling Channel (MSCH) is a logical channel used for a point-to-multipoint downlink transmission of an MBMS service transmission schedule between a network and UEs in RRC Connected or Idle Mode. Control plane information on MSCH is MBMS service and S-CCPCH specific and is sent to the UEs in a cell receiving MTCH. An MSCH is sent in each S-CCPCH carrying the MTCH. The MSCH is mapped to a specific FACH in the S-CCPCH as indicated on the MCCH. Due to different error requirements, the MSCH is mapped to a FACH different from the MTCH.

In general, FACH is used as a transport channel for MTCH, MSCH and MCCH. Moreover, S-CCPCH is used as a physical channel for FACH carrying the MTCH, MSCH or MCCH.

In general, the following connections between logical channels and transport channels exist only in downlink: 1) MCCH can be mapped to FACH; 2) MTCH can be mapped to FACH; and 3) MSCH can be mapped to FACH. The mappings as seen from the UE and UTRAN sides are shown in FIG. 8 and FIG. 9, respectively.

For MCCH, the RLC mode to be employed is UM-RLC, with required enhancements to support out-of-sequence SDU delivery. A MAC header is used for logical channel type identification.

For MTCH, the RLC mode to be employed is UM-RLC, with required enhancements to support selective combining. Quick repeat may be used in RLC-UM. A MAC header is used for logical channel type identification and MBMS service identification.

For MSCH, the RLC mode to be employed is UM-RLC. A MAC header is used for logical channel type identification.

MBMS notification utilizes an MBMS specific PICH called an MBMS Notification Indicator Channel (MICH) in a cell. Coding for the MICH is defined in Stage-3 physical layer specifications.

In general, MCCH information is transmitted based on a fixed schedule, wherein the schedule identifies the TTI (Transmission Time interval), i.e., multiple of frames containing the beginning of the MCCH information. The transmission of the MCCH information can take a variable number of TTIs, and the UTRAN preferably transmits the MCCH information in consecutive TTIs. The UE will continue to receive the S-CCPCH until: 1) the UE receives all of the MCCH information; 2) the UE receives a TTI that does not include any MCCH data; or 3) information contents indicate that further reception is not required (e.g., no modification to the desired service information).

Based on this behavior, the UTRAN can repeat the MCCH information following a scheduled transmission in order to improve reliability. The MCCH schedule is common for all services.

All MCCH information will be transmitted periodically based on a "repetition period". A "modification period" is defined as an integer multiple of the repetition period. MBMS ACCESS INFORMATION may be transmitted periodically based on an "access info period", which is an integer divider of the "repetition period". The values for the repetition period and modification period are given in the system information of the cell in which MBMS is sent.

MCCH information is split into critical and non-critical information. The critical information is made up of MBMS NEIGHBORING CELL INFORMATION, MBMS SERVICE INFORMATION and MBMS RADIO BEARER INFORMATION. The non-critical information corresponds to MBMS ACCESS INFORMATION. Changes to the critical information are applied at the first MCCH transmission of a modification period and at the beginning of each modification period. The UTRAN transmits MBMS CHANGE INFORMATION including MBMS services IDs whose MCCH information is modified at that modification period. The MBMS CHANGE INFORMATION is repeated at least once in each repetition period of that modification period. Changes to non-critical information can take place at any time.

FIG. 10 illustrates the schedule with which the MBMS SERVICE INFORMATION and RADIO BEARER INFORMATION is transmitted. Different block patterns indicate potentially different MCCH content.

In order to increase coverage, a UE which is located between different cells can receive the same MBMS services from different cells at the same time, and combine the received information as shown in FIG. 11. In this case, the UE reads the MCCH from a cell it has selected based on a certain algorithm.

Referring to FIG. 11, on the MCCH from the selected cell (e.g., cell A-B), the UE receives information on a service that the UE is interested in. This information contains information related to the configuration of physical channels, transport channels, an RLC configuration, a PDCP configuration, etc. of the current cell, and neighboring cells that the UE might be able to receive (e.g., cell A-A and cell B). In other words, the received information contains information that the UE needs in order to receive an MTCH carrying a service that the UE is interested in cells A-A, A-B and B.

When the same service is transported on different cells, the UE may or may not be able to combine the service from the different cells. In case that combining is possible, the combining is performed at different levels: 1) no combining possible; 2) selective combining at RLC level; and 3) L1 combining at physical level.

Selective combining for an MBMS point-to-multipoint transmission is supported by RLC PDU numbering. Therefore, selective combining in the UE is possible from cells providing similar MBMS RB bit rates, provided that de-synchronization between MBMS point-to-multipoint transmission streams does not exceed the RLC re-ordering capability of the UE. Thus, there exists one RLC entity in the UE side.

For selective combining, there exists one RLC entity per MBMS service utilizing a point-to-multipoint transmission in the cell group of the CRNC. All cells in the cell group are under the same CRNC. In case de-synchronization occurs between MBMS transmissions in neighboring cells belonging to an MBMS cell group, the CRNC may perform re-synchronization actions enabling UEs to perform the selective combining between these cells.

For time division duplexing (TDD), selective combining and soft combining can be used when Node-Bs are synchronized. For frequency division duplexing (FDD), soft combining can be used when Node-Bs are synchronized inside a UE's soft combining reception window, and the data fields of the soft combined S-CCPCHs are identical during soft combining moments.

When selective or soft combining is available between cells, the UTRAN sends MBMS NEIGHBORING CELL INFORMATION containing the MTCH configuration of the neighboring cells available for selective or soft combining. When partial soft combining is applied, the MBMS NEIGHBORING CELL INFORMATION contains an L1-combining schedule, which indicates the moments in time when the UE may soft combine the S-CCPCH transmitted in neighboring cells with the S-CCPCH transmitted in a serving cell. With MBMS NEIGHBORING CELL INFORMATION, the UE is able to receive an MTCH transmission from neighboring cells without receiving the MCCH of these neighboring cells.

The UE determines the neighboring cell suitable for selective or soft combining based on a threshold (e.g., measured CPICH Ec/No) and the presence of MBMS NEIGHBORING CELL INFORMATION of that neighboring cell. The possibility of performing selective or soft combining is signaled to the UE.

The long-term evolution (LTE) of UMTS is under discussion by the 3rd generation partnership project (3GPP) that standardized UMTS. The 3GPP LTE is a technology for enabling high-speed packet communications. Many schemes have been proposed for the LTE objective including those that aim to reduce user and provider costs, improve service quality, and expand and improve coverage and system capacity.

FIG. 12 illustrates the architecture of an LTE system. Each aGW 115 is connected to one or several access Gateways (aGW) 115. An aGW 115 is connected to another Node (not shown) that allows access to the Internet and/or other networks, such as GSM, UMTS, and WLAN.

The 3GPP LTE requires reduced cost per bit, increased service availability, flexible use of a frequency band, a simple structure, an open interface, and adequate power consumption of a terminal as an upper-level requirement. Generally, The UTRAN 2 corresponds to E-UTRAN (Evolved-UTRAN). The NodeB 5 and/or RNC 4 correspond to e-NodeB (eNB) 105 in the LTE system.

In 3GPP LTE systems, system information (SI) carries different cell and network specific parameters to a UE for successful attachment to a network. The system information also facilitates paging and allows the UE to use different network services. Every cell continually broadcasts its system information on a channel, such as a broadcast control channel (BCCH). Moreover, every UE registering to the network or performing a handover to a particular cell first reads the cell specific information.

Previously, the MSCH allows the scheduling of periods during which the UE can expect to receive an MBMS service. However, this mechanism may not be suitable for certain services. For example, problems may occur with regard to television (TV) or TV-like services on FDD, which have a constant bit rate but are multiplexed together with other services on one S-CCPCH.

SUMMARY OF THE INVENTION

The present invention is related to a discontinuous reception operation for a constant data rate service.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for communicating between a network and a mobile terminal in a wireless communication system, the method comprising receiving a channel during a transmission time interval, and determining not to receive a transmission from the network for a predetermined amount of transmission time intervals related to the channel after receiving the channel. Preferably, the channel is a physical channel on which a transport channel is mapped.

In one aspect of the invention, the predetermined amount of transmission time intervals related to the channel is the number of transmission time intervals between the transmission of the channel and a next transmission of the same channel. In another aspect of the invention, the predetermined amount of transmission time intervals related to the channel is the number of transmission time intervals between the beginning of a transmission time interval in which the channel is transmitted and the beginning of a next transmission time interval in which the same channel is transmitted.

In a further aspect of the invention, the predetermined amount of transmission time intervals related to the channel is dependent on configuration parameters of the physical channel on which the transport channel is mapped. Preferably, the configuration parameters comprise at least one of a modulation scheme, a spreading factor, and a transmission time interval used.

Preferably, the predetermined amount of transmission time intervals related to the channel is set by the network. Preferably, the predetermined amount of transmission time intervals related to the channel is received from the network via at least one of a point-to-multipoint control channel, and a dedicated signal.

In accordance with the present invention, the method further comprises receiving service data mapped on the channel, and determining not to receive a transmission from the network for a predetermined amount of transmission time intervals related to the service data after decoding the service data. Preferably, the predetermined amount of transmission time intervals related to the service data is the number of transmission time intervals between the beginning of a transmission time interval in which the service data is transmitted and the beginning of a next transmission time interval in which the same service data is transmitted.

In accordance with one embodiment of the present invention, a method for communicating between a network and a mobile terminal in a wireless communication system comprises receiving an initial portion of a transmission, the initial portion comprising an indicator indicating a specific transport channel carried by a physical channel, decoding the indicator, determining whether the specific transport channel carried by the physical channel is a desired transport channel based on the decoded indicator, and determining not to receive a remaining portion of the transmission if it is determined that the specific transport channel carried by the physical channel is not a desired transport channel.

In accordance with another embodiment of the present invention, a method for communicating between a network and a mobile terminal in a wireless communication system comprises receiving an indicator indicating a transport channel to be received during a transmission time interval, and determining not to receive a transmission from the network for a predetermined amount of transmission time intervals related to the transport channel after receiving the indicator.

In accordance with another embodiment of the present invention, a method for communicating between a network and a mobile terminal in a wireless communication system comprises setting a predetermined amount of transmission time intervals related to a channel, transmitting the channel during a transmission time interval, and transmitting the same channel after the predetermined amount of transmission time intervals elapses. Preferably, the channel is a physical channel on which a transport channel is mapped.

In one aspect of the invention, the predetermined amount of transmission time intervals related to the channel is the number of transmission time intervals between the transmission of the channel and a next transmission of the same channel. In another aspect of the invention, the predetermined amount of transmission time intervals related to the channel is the number of transmission time intervals between the beginning of a transmission time interval in which the channel is transmitted and the beginning of a next transmission time interval in which the same channel is transmitted.

In a further aspect of the invention, the predetermined amount of transmission time intervals related to the channel is dependent on configuration parameters of the physical channel on which the transport channel is mapped. Preferably, the configuration parameters comprise at least one of a modulation scheme, a spreading factor, and a transmission time interval used.

In accordance with the present invention, the method further comprises transmitting the predetermined amount of transmission time intervals related to the channel to the mobile terminal. Preferably, the predetermined amount of transmission time intervals related to the channel is transmitted to the mobile terminal via at least one of a point-to-multipoint control channel, and a dedicated signal.

In one aspect of the invention, the method further comprises transmitting service data mapped on the channel, wherein the mobile terminal determines not to receive a transmission from the network for a predetermined amount of transmission time intervals related to the service data after decoding the service data. Preferably, the predetermined amount of transmission time intervals related to the service data is the number of transmission time intervals between the beginning of a transmission time interval in which the service data is transmitted and the beginning of a next transmission time interval in which the same service data is transmitted.

In accordance with one embodiment of the present invention, a method for communicating between a network and a mobile terminal in a wireless communication system comprises transmitting a signal to a mobile terminal, and including an indicator in an initial portion of the transmission, the indicator indicating a specific transport channel carried by a physical channel, wherein the mobile terminal decodes the indicator, determines whether the specific transport channel carried by the physical channel is a desired transport channel based on the decoded indicator, and determines not to receive a remaining portion of the transmission if it is determined that the specific transport channel carried by the physical channel is not a desired transport channel.

In accordance with another embodiment of the present invention, a method for communicating between a network and a mobile terminal in a wireless communication system comprises setting a predetermined amount of transmission time intervals related to a transport channel, transmitting an indicator indicating a transport channel to be received by the mobile terminal during a transmission time interval, and transmitting the transport channel after the predetermined amount of transmission time intervals elapses.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a discontinuous reception operation for a constant data rate service.

Reference will now be made in detail to the preferred embodiments of the present invention, examples of which are illustrated in the accompanying drawings. Wherever possible, the same reference numbers will be used throughout the drawings to refer to the same or similar parts.

Figure 1:
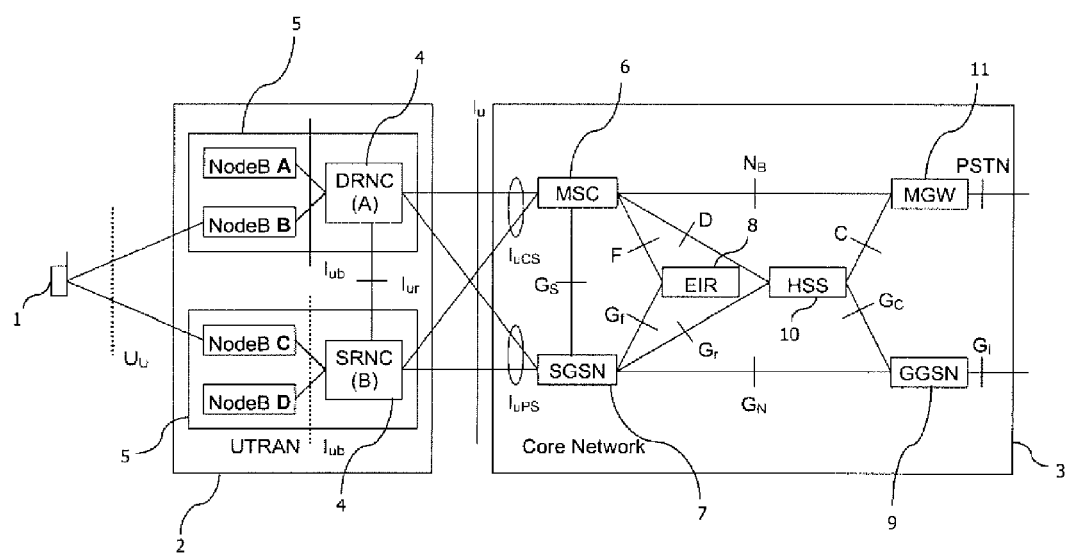
FIG. 1 illustrates a conventional UMTS network.
Figure 2:
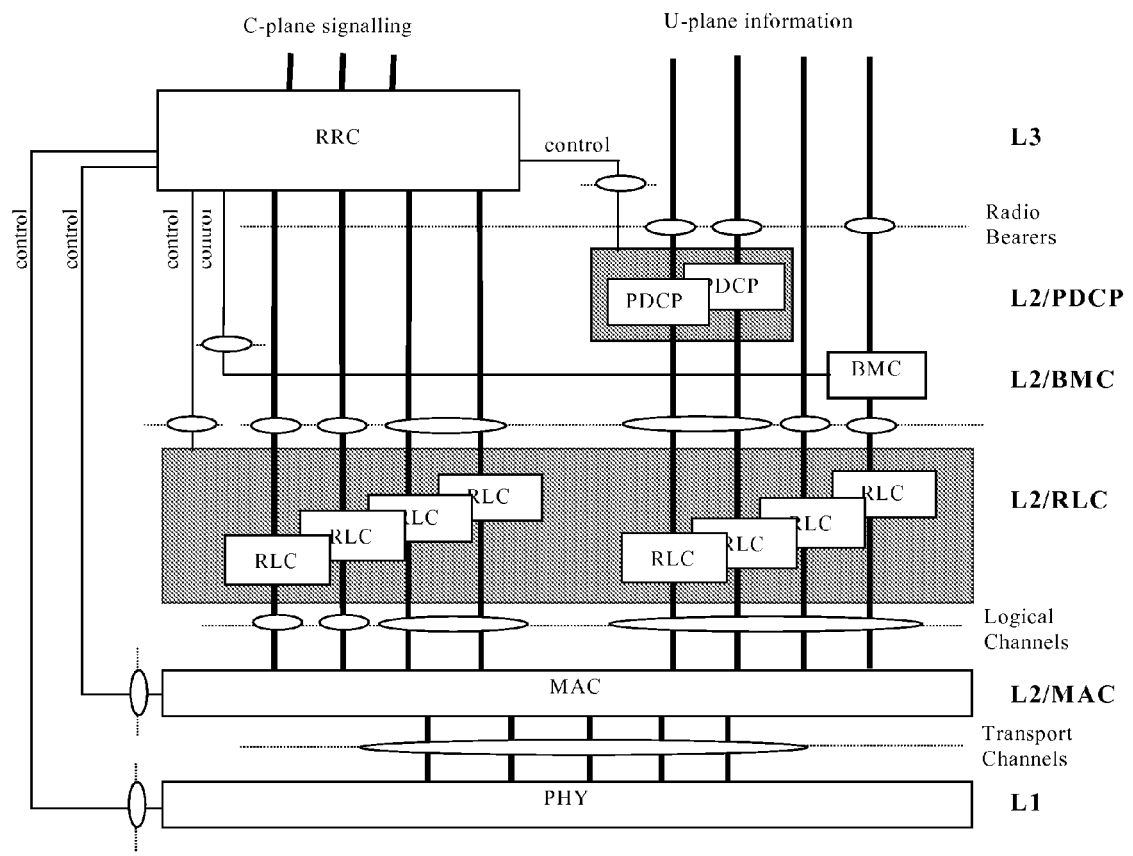
FIG. 2 illustrates a conventional radio interface protocol between a UE and UTRAN.
Figure 3:
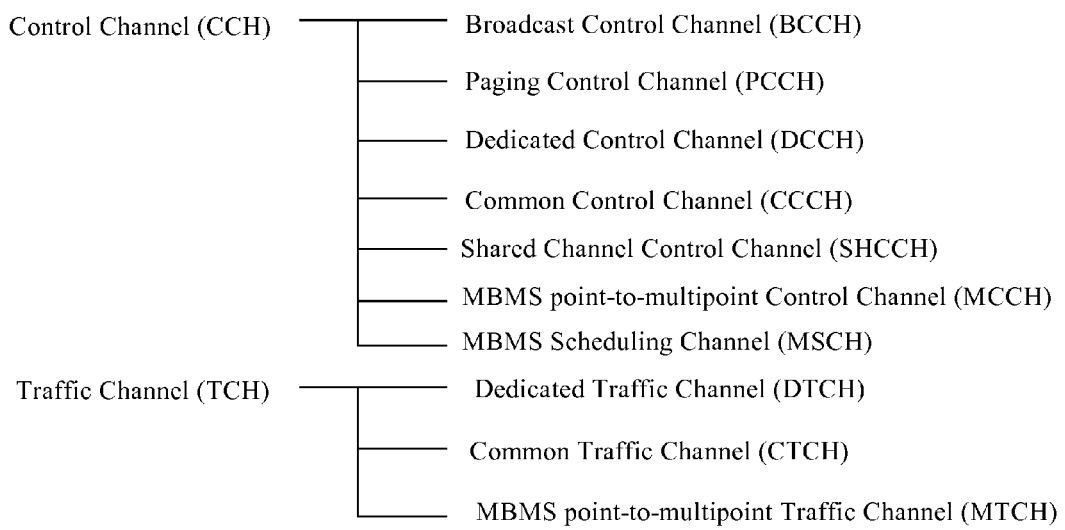
FIG. 3 illustrates logical channel structure.
Figure 4:
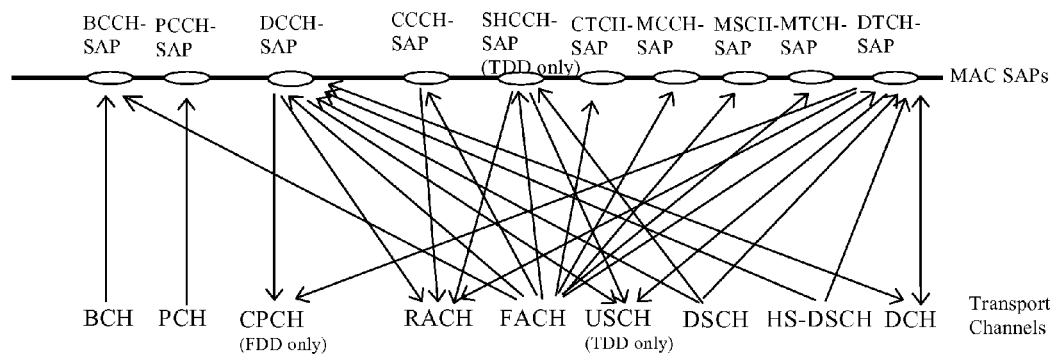
FIG. 4 illustrates possible mappings between logical channels and transport channels from the UE perspective.
Figure 5:
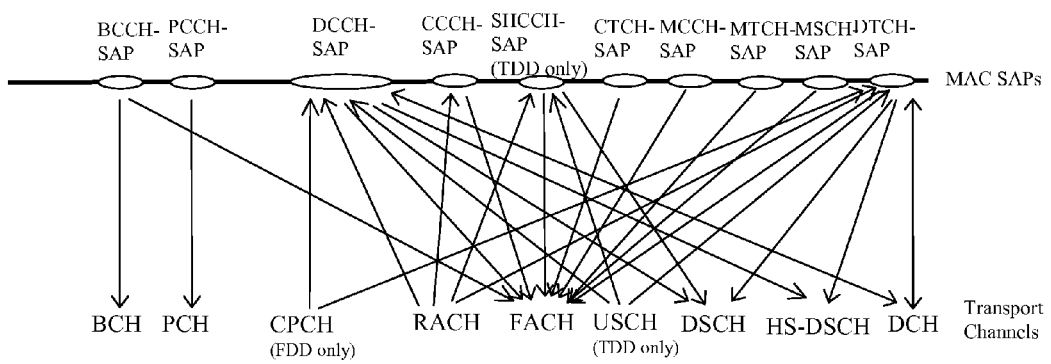
FIG. 5 illustrates possible mappings between logical channels and transport channels from the UTRAN perspective.
Figure 6:
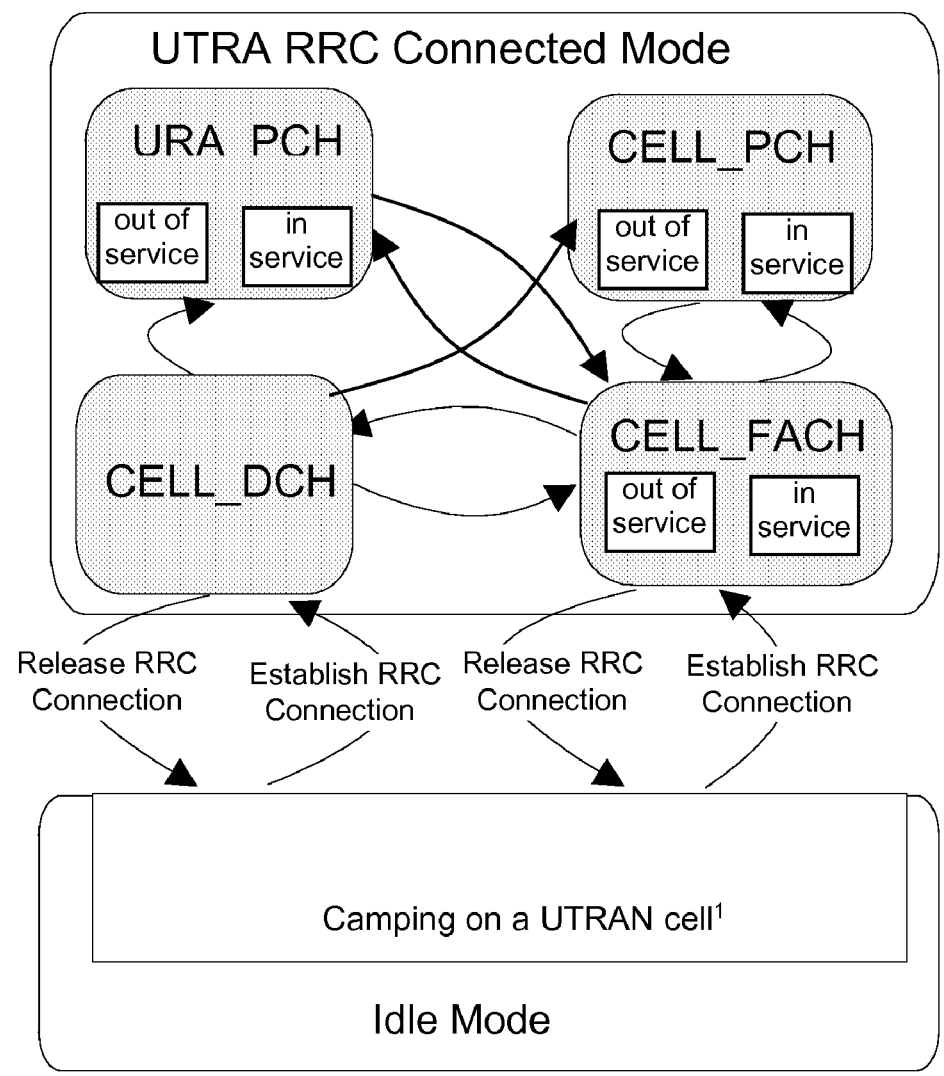
FIG. 6 illustrates possible UE state transitions.
Figure 7:
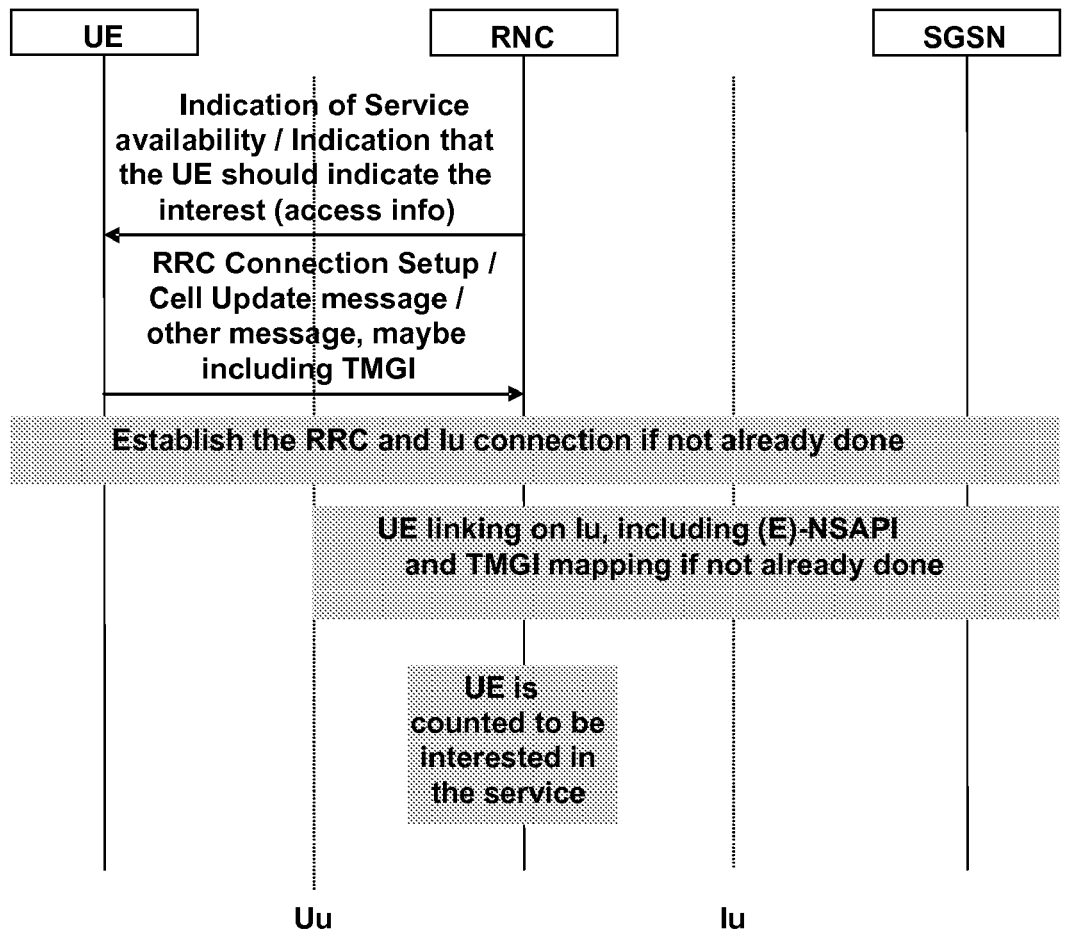
FIG. 7 illustrates a typical counting procedure.
Figure 8:
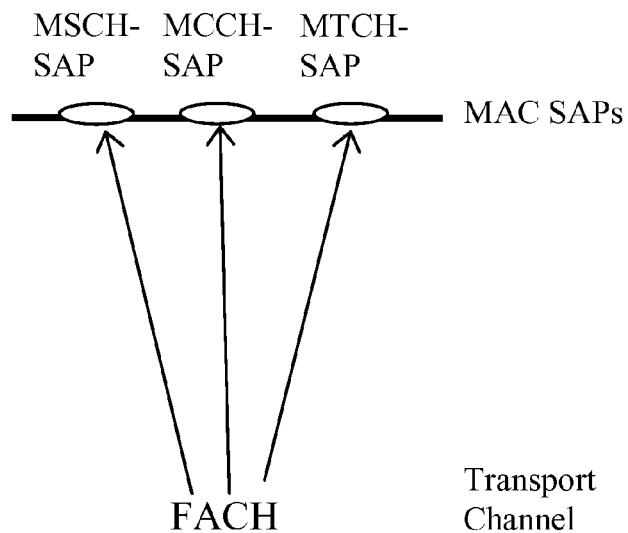
FIG. 8 illustrates mapping between logical channels and a transport channel as seen from the UE perspective.
Figure 9:
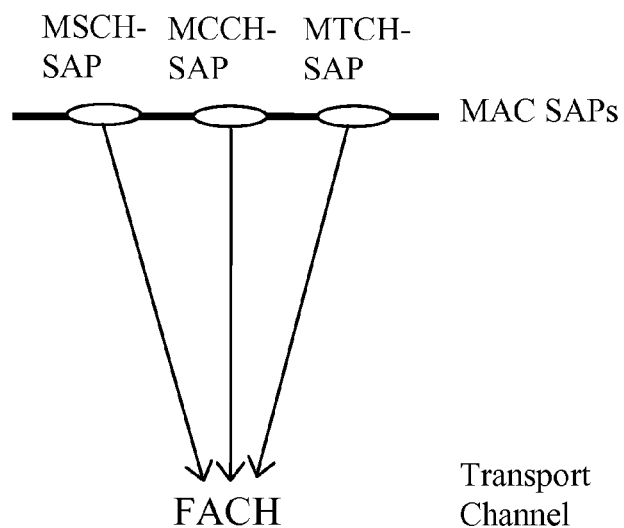
FIG. 9 illustrates mapping between logical channels and a transport channel as seen from the UTRAN perspective.
Figure 10:
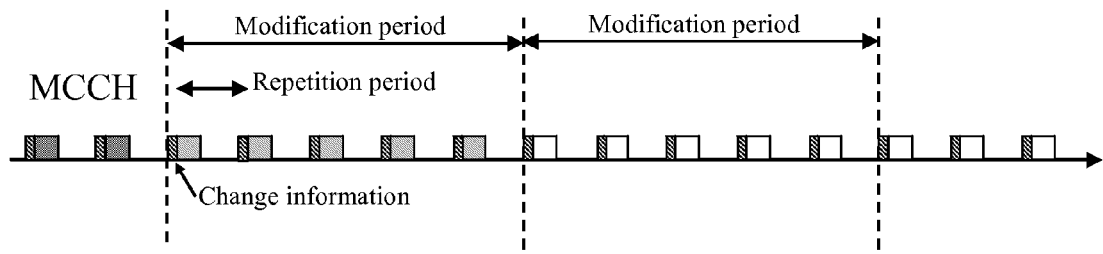
FIG. 10 illustrates a schedule with which the MBMS service information and radio bearer information is transmitted.
Figure 11:
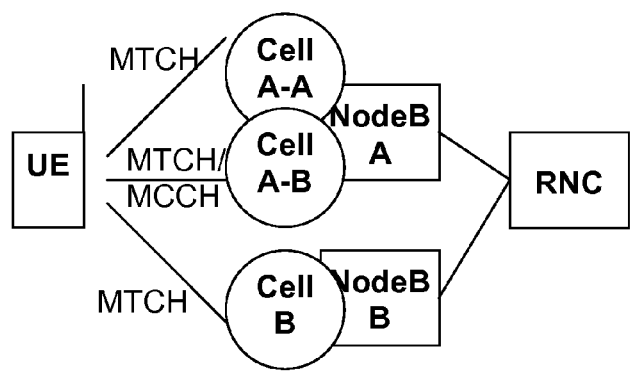
FIG. 11 illustrates a UE receiving MBMS service from several cells.
Figure 12:
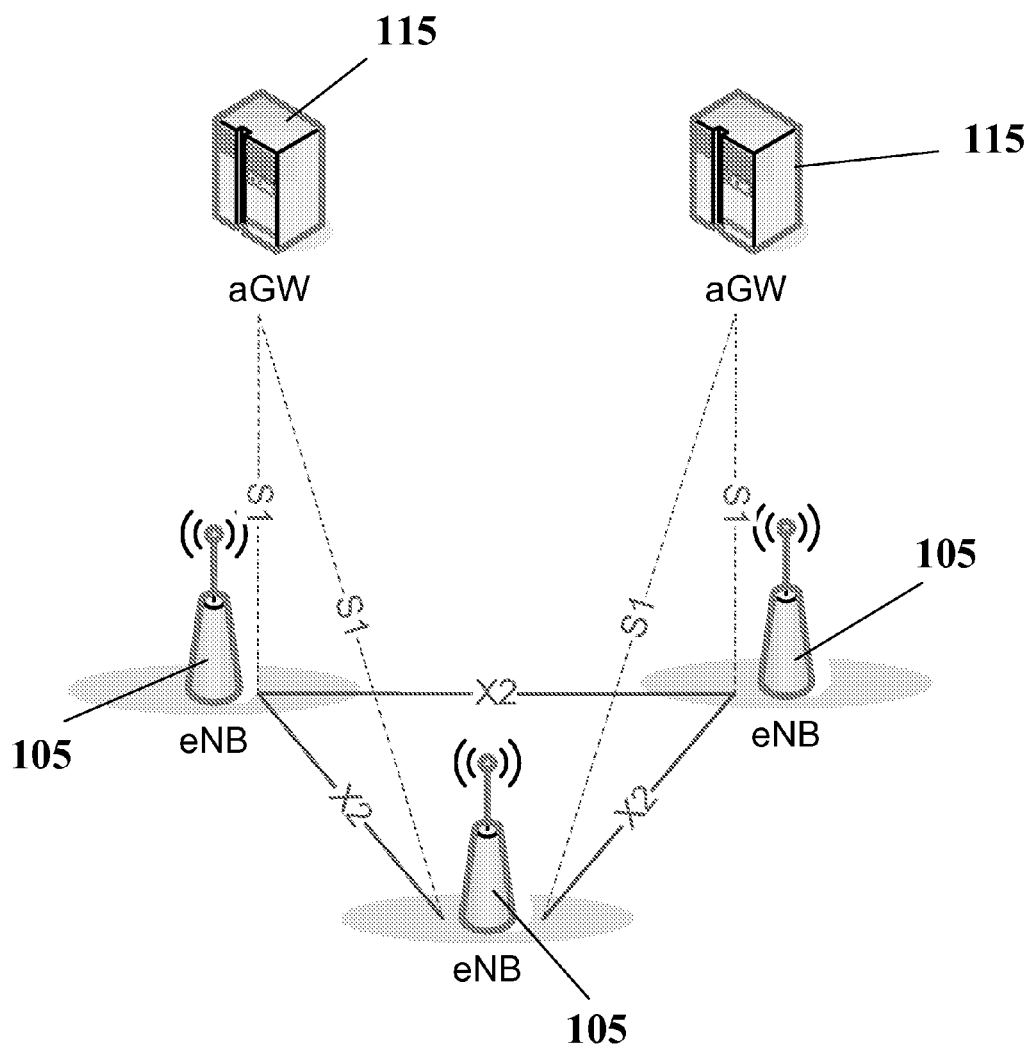
FIG. 12 illustrates the architecture of an LTE system.
Figure 13:
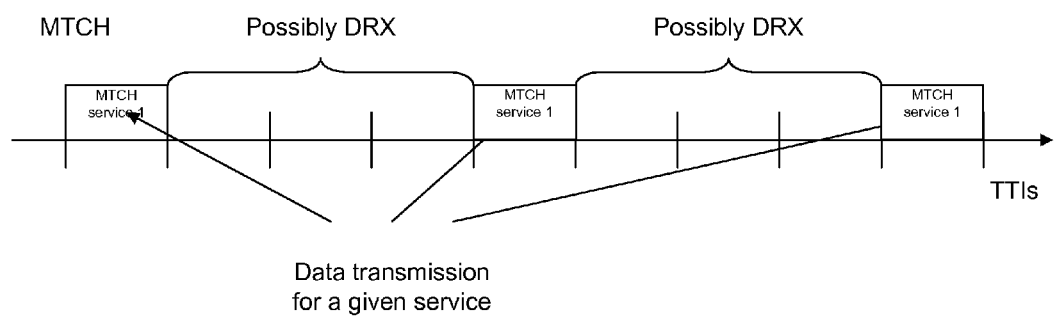
FIG. 13 illustrates a discontinuous reception (DRX) period for a constant data rate service in accordance with one embodiment of the present invention.

FIG. 13 illustrates a discontinuous reception (DRX) period for a constant data rate service. To allow a DRX operation for a constant (or close to constant) data stream, a peak data rate is preferably higher than an average data rate. In UMTS FDD using the S-CCPCH, this is possible by creating transmission time intervals (TTIs) during which a given service is not transmitted, as shown in FIG. 13.

In MBMS, different ways to multiplex different bearer services include: 1) MAC multiplexing; and 2) Transport channel multiplexing. In MAC multiplexing, two services share the same transport channel, wherein the two services are identified using the MAC header. In Transport channel multiplexing, two services are carried by different transport channels, wherein the UE is informed via a TFCI carried on a control channel which transport blocks contained in a TTI contain data from which transport channel.

In MBMS, it is also possible to have different services multiplexed by the MAC on different transport channels while having different transport channels multiplexed on one physical channel. Here, a TTI preferably comprises 1 to 8 frames, and a complete TFCI is indicated in each frame.

In order to perform DRX, the UE has to know the periods during which a service the UE is interested in is not transmitted. An MSCH can specify at most one period for which a given service can be transmitted, and thus implicitly indicates DRX periods if they are large periods. However, with regard to services with a constant data rate, it is costly to transmit the MSCH to indicate every period in which the service is transmitted to implicitly indicate every DRX period. If the MSCH is sent synchronously with the MTCH, the UE can perform maximum DRX. However, if the MSCH is sent with a time delay, the maximum DRX period is reduced because the UE receives TTIs during which the MTCH and the MSCH are transmitted.

In accordance with the present invention, peak data rate and TTI length immediately impact UE complexity. UE complexity is mainly determined by the number of demodulated soft bits the UE has to be able to store and process per frame and per TTI, as well as the number of bits corresponding to the transport blocks of the transport channels the UE has to receive and process in a given time frame.

Figure 14:
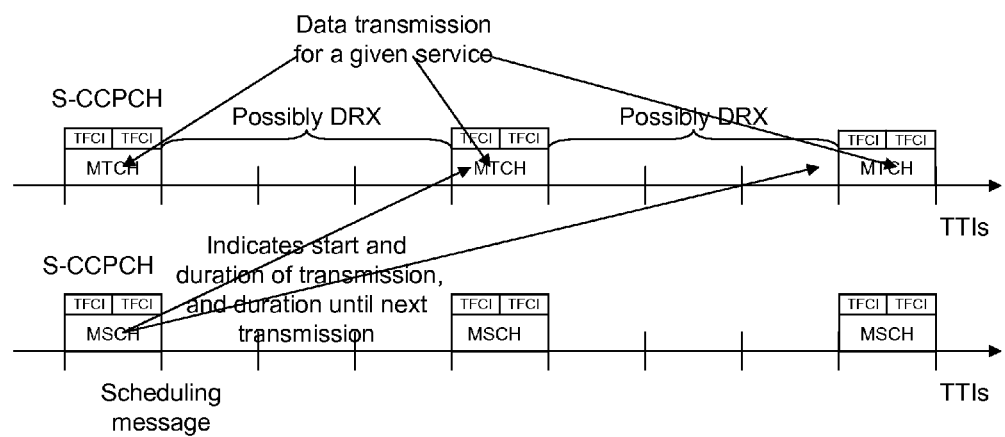
FIG. 14 illustrates a discontinuous reception (DRX) period indicated by a scheduling channel for a constant data rate service in accordance with one embodiment of the present invention.
Figure 15:
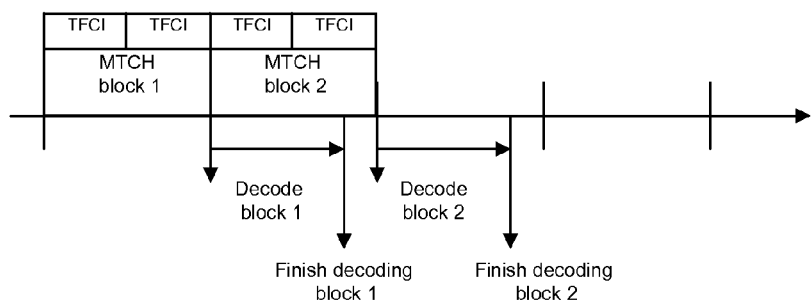
FIG. 15 illustrates receiving and decoding data blocks without a discontinuous reception (DRX) operation.

FIG. 14 illustrates a discontinuous reception (DRX) period indicated by an MSCH for a constant data rate service. FIG. 15 illustrates receiving and decoding data blocks without a discontinuous reception (DRX) operation. Normally, the UE has to be able to receive data every TTI. Thus, the decoding performance allows decoding of a certain number of bits per second, which corresponds to the maximum size of bits per transport channel per TTI during one TTI, as shown in FIG. 14. However, when several constant bitrate streams are multiplexed together, and the UE only has to decode one of the multiplexed streams, it would be preferable for the UE to decode the transport blocks of the transport channel that include data of the service the UE is interested in. Thus, if a transport channel only contains data from a given stream, this would allow the UE to only decode data at a rate corresponding to the data rate of the service the UE is interested in, and not at the peak data rate at which the stream is transmitted.

However, it is difficult for the UE to know whether there is a certain minimum number of TTIs between two TTIs that contain service data the UE is interested in. Thus, to allow the UE to process and receive only one out of several services that are multiplexed on the same physical channel, it is preferable that the UE rely on the network to create a minimum gap between the transmission of two TTIs that contain data of the same service. Thus, when the UE learns in which TTIs a given service is scheduled, the UE can process only those TTIs.

Figure 16:
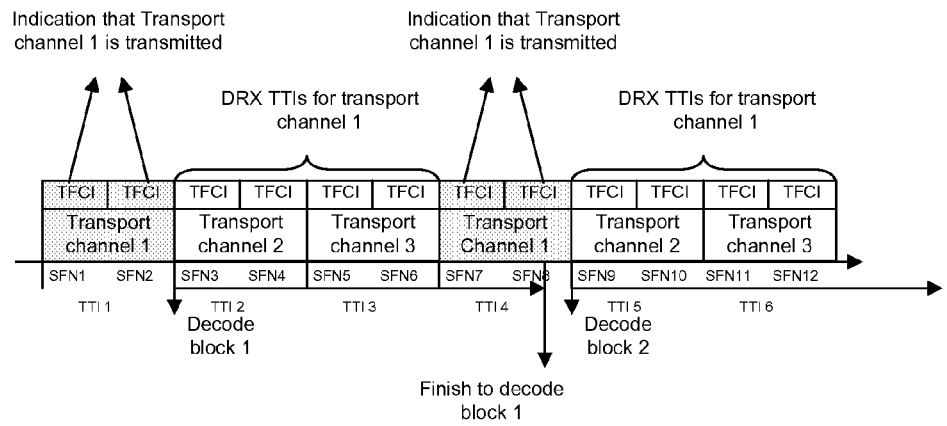
FIG. 16 illustrates a discontinuous reception (DRX) operation for a constant data rate service in accordance with one embodiment of the present invention.

In accordance with one embodiment of the present invention, the minimum gap between the transmission of two TTIs that contain data of the same service may be created by indicating the TTIs for which a service is scheduled in relation to the SFN of the cell. For example, a service may be scheduled for a TTI that starts in a frame for which SFN mod a equals b, where a is the periodicity of the transmission and b indicates an offset. This example is shown in FIG. 16, where for the transport channel 1 the parameter a is 6, and the parameter b is 1. Thus, the transmission of the transport channel 1 is scheduled every 6th frame, starting with the frame 1.

In accordance with another embodiment of the present invention, the processing requirements of the UE may be reduced by introducing a minimum number of DRX TTIs after the transmission of a given transport channel. Hence, the network ensures a minimum period after each transmission during which the UE can switch off the radio part of its receiver. For example, if eight transport channels are configured, then the network can specify as many as seven DRX TTIs after each TTI during which the UE, which is only interested in one service, does not have to receive any data.

Figure 17:
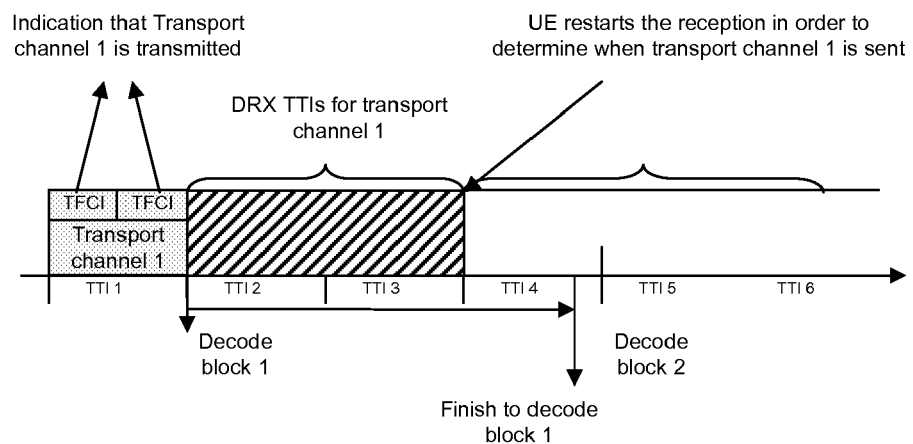
FIG. 17 illustrates a discontinuous reception (DRX) operation for a constant data rate service in accordance with another embodiment of the present invention.

Accordingly, the data rate of the S-CCPCH would be devised amongst the transport channels, where the maximum data rate of one transport channel would depend on the minimum number of DRX TTIs after each transmission. In the example that eight transport channels are configured, but only a DRX period of two TTIs is specified for the transport channel 1, which is the transport channel the UE wants to receive, then the UE capabilities only have to correspond to one third of the peak data rate, as shown in FIG. 17. Consequently, this still allows for some flexibility in the network scheduler and variations of the data rate, i.e. the maximum data rate the scheduler can transmit is one third of the peak data rate.

Referring to FIG. 17, if a transmission for the transport channel 1 is completed in TTI 1, the UE can discontinue reception during the two TTIs after the last reception of a TTI including data for the transport channel 1. Specifically, the UE discontinues reception during TTI 2 and TTI 3. Thereafter, the earliest possible time for the network to schedule a transmission for the same transport channel is TTI 4. Notably, the network may schedule a transmission for the same transport channel for a later time because the UE will continuously receive at least the TFCI beginning from TTI 4 until the UE receives a transmission of transport channel 1 from the network. Preferably, the UE will only start decoding when it identifies, using the TFCI, that the transport channel 1 is used for the transmission. Therefore, the UE can perform decoding during three TTIs instead of having to decode the data during one TTI to be ready to decode a subsequent immediate transmission. Preferably, until the UE has at least received one transmission from the network, the UE will continuously receive at least the TFCI in order to detect which transport channel is transmitted.

In accordance with the present invention, the minimum number of DRX TTIs may be sent either on the MCCH dynamically or in one of the configuration messages. Alternatively, the minimum number of DRX TTIs may be defined according to other parameters, such as modulation scheme, spreading factor, or the TTI used, for example. The minimum number of DRX TTIs may also be included in the transmission of the transport channel and thus be reconfigured with every transmission.

In accordance with the present invention, the above description preferably describes an operation with regard to a transport channel level, wherein a transport channel may contain a transmission of different multiplexed services. Accordingly, this allows to further modulate the data rate of one service that a UE might be interested in.

In accordance with one embodiment of the present invention, the above-described mechanism may also be applied to other types of channels, such as a shared channel as used in HSDPA or LTE. For example, if a UE monitors specific streams, such as a transmission using a specific H-RNTI/C-RNTI, or using a specific HARQ process, and performs DRX after the successful reception of data on that given stream, then the network is allowed to schedule new data/retransmissions after a specific time after the last transmission.

Figure 18:
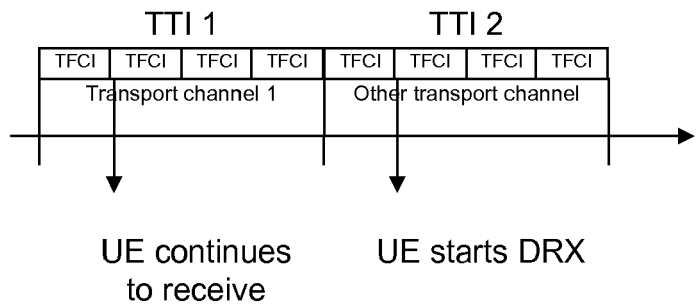
FIG. 18 illustrates a discontinuous reception (DRX) period indicated by a scheduling channel for a constant data rate service in accordance with another embodiment of the present invention.

FIG. 18 illustrates a discontinuous reception (DRX) period indicated by the MSCH for a constant data rate service in accordance with another embodiment of the present invention. To determine whether a TTI/frame contains the transport channel that the UE is interested in, the UE may decode the TFCI of one frame at the start of the TTI. Referring to FIG. 18, because the UE can start decoding the TTI only after the complete TTI is received, the UE can immediately determine after receiving the first frame of a TTI whether it is necessary to continue receiving the full TTI. The UE can further immediately determine whether it is necessary to decode the particular TTI if the UE wishes to receive a service multiplexed on that transport channel, or whether the UE can switch to DRX until the beginning of a next TTI.

Figure 19:
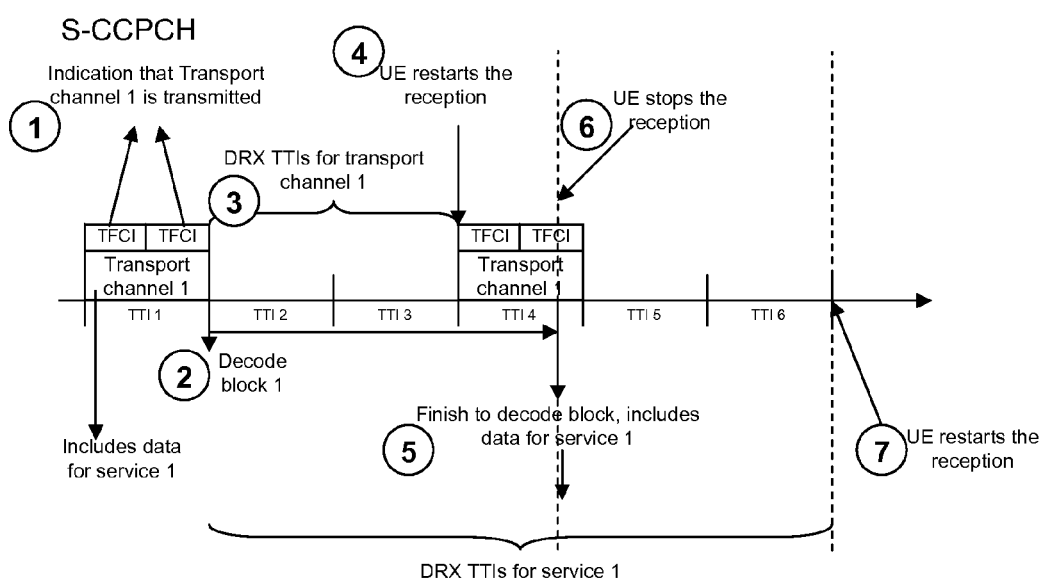
FIG. 19 illustrates a discontinuous reception (DRX) period indicated by a scheduling channel for a constant data rate service in accordance with another embodiment of the present invention.

FIG. 19 illustrates a discontinuous reception (DRX) period indicated by the MSCH for a constant data rate service in accordance with another embodiment of the present invention. In order to increase power saving in the UE, the UE may determine DRX TTIs similar to the ones discussed above; however, the DRX TTIs are based on a transmission containing data for a given service, and not on a transport channel. Preferably, once the UE receives a certain packet for a given service, the next packet for that service is not sent by the network before a specific time. Referring to FIG. 19, the UE is interested in a service 1, which is mapped on a transport channel 1. As described above, a minimum DRX period of two TTIs is configured for the transport channel 1. For the service 1 multiplexed on transport channel 1, a minimum DRX period of 5 TTIs is defined.

At the start of UE reception, the UE continuously receives TFCIs and stores the data. When a TFCI indicates that the transport channel 1 is detected, the UE continues reception and decodes the TTI after the complete TTI is received. If the TFCI indicates that another transport channel is transmitted, the UE stops reception and discards the already stored data until the beginning of the next TTI.

Still referring to FIG. 19, when the UE receives the TFCI indicating that the transport channel 1 is transmitted (step 1), the UE continues to receive the complete TTI and starts decoding data after the TTI is received (step 2). If the transport channel is configured with a DRX period of two TTIs, the UE does not receive TTIs 2 and 3 (step 3). Thereafter, if the UE has not yet finished decoding the data at the beginning of the TTI 4, the UE restarts reception of TTIs, i.e. TTI 4 (step 4).

In FIG. 19, decoding of the data received in TTI 1 is completed during TTI 4 (step 5). Accordingly, if the UE determines that data for service 1 was included in the transmission of transport channel 1, the UE can apply the DRX period of five TTIs associated with the reception of the data of service 1. Hence, once the UE learns that the data of service 1 was already received in TTI 1, the UE can immediately stop receiving TTIs (step 6). The UE will then resume receiving TTIs at TTI 7, which is five TTIs away from the last reception of data for the service 1 (step 7).

Alternatively, if decoding of the data received in TTI 1 is completed prior to the beginning of TTI 4, then the UE is made aware earlier that the data of service 1 was transmitted in TTI 1. Thus, the UE would not restart reception of TTIs at TTI 4. Accordingly, the UE may possibly begin a DRX state at TTI 2 and restart reception of TTIs at the end of TTI 6.

Furthermore, if in step 5 the UE determines that no data for the service 1 is received, the UE would continue receiving TTIs in step 6. The UE would then decode the data received in TTI 4.

In accordance with the present invention, the UE capabilities necessary for processing a data stream are reduced. This is done by allowing the UE to interrupt reception after receiving a data block belonging to a stream that may contain data belonging to a given service. Accordingly, the time the UE can use for processing the received data is increased. Moreover, during the increased time the UE can switch its receiver off, thus reducing the UE's power consumption. To increase DRX periods further, the UE may stop receiving for a determined time period after the reception of a service.

Figure 20:
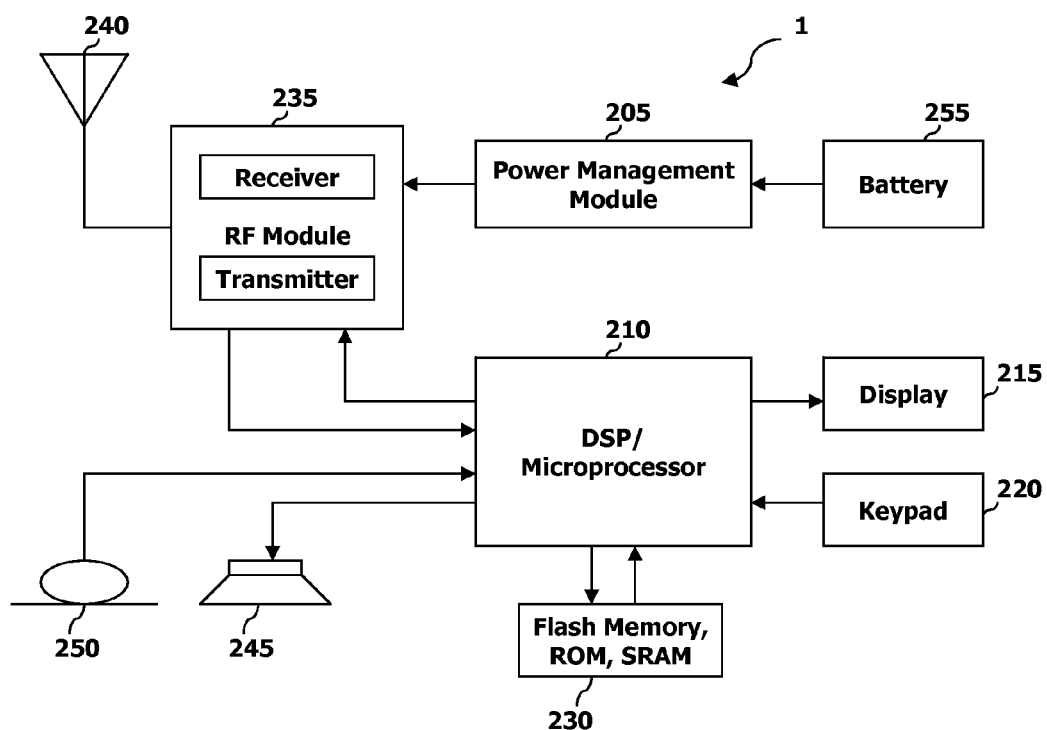
FIG. 20 illustrates a block diagram of a mobile station (MS) or UE in accordance with one embodiment of the present invention.

FIG. 20 illustrates a block diagram of a mobile station (MS) or UE 1 in accordance with the present invention. The UE 1 includes a processor (or digital signal processor) 210, RF module 235, power management module 205, antenna 240, battery 255, display 215, keypad 220, memory 230, speaker 245 and microphone 250.

A user enters instructional information, such as a telephone number, for example, by pushing the buttons of a keypad 220 or by voice activation using the microphone 250. The microprocessor 210 receives and processes the instructional information to perform the appropriate function, such as to dial the telephone number. Operational data may be retrieved from the memory module 230 to perform the function. Furthermore, the processor 210 may display the instructional and operational information on the display 215 for the user's reference and convenience.

The processor 210 issues instructional information to the RF module 235, to initiate communication, for example, transmits radio signals comprising voice communication data. The RF module 235 comprises a receiver and a transmitter to receive and transmit radio signals. An antenna 240 facilitates the transmission and reception of radio signals. Upon receiving radio signals, the RF module 235 may forward and convert the signals to baseband frequency for processing by the processor 210. The processed signals would be transformed into audible or readable information outputted via the speaker 245, for example. The processor 210 also includes the protocols and functions necessary to perform the various processes described herein.

It will be apparent to one skilled in the art that the mobile station 1 may be readily implemented using, for example, the processor 210 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for communicating between a network and a mobile terminal in a wireless communication system, the method comprising:
   receiving, from the network, downlink data on a secondary common control physical channel (S-CCPCH);
   discontinuing the receiving of the downlink data on the S-CCPCH for a minimum period of time that is determined by configuration parameters of modulation scheme, spreading factor (SF), and transmission time interval (TTI) used for a Forward Access Channel (FACH) in the S-CCPCH; and
   receiving after the minimum period of time, from the network, further downlink data on the S-CCPCH.

2. The method of claim 1, wherein the S-CCPCH is a physical channel on which a transport channel is mapped.

3. The method of claim 1, wherein the minimum period of time is a number of transmission time intervals between a first transmission on the S-CCPCH and a next transmission on the S-CCPCH.

4. The method of claim 1, wherein the minimum period of time is a number of transmission time intervals between a beginning of a first transmission time interval in which the S-CCPCH is transmitted and a beginning of a next transmission time interval in which the S-CCPCH is transmitted.

5. The method of claim 1, wherein the configuration parameters are related to the S-CCPCH.

6. The method of claim 1, wherein an amount of the TTIs used is set by the network.

7. The method of claim 6, wherein the amount of TTIs used is received from the network via at least one of:
   a point-to-multipoint control channel; and
   a dedicated signal.

8. A method for communicating between a network and a mobile terminal in a wireless communication system, the method comprising:
   receiving, from the network, an indicator indicating a transport channel to be received during a transmission time interval;
   receiving, from the network, downlink data on the transport channel that is mapped onto a secondary common control physical channel (S-CCPCH);
   discontinuing the receiving of the downlink data on the transport channel for a minimum period of time that is determined by configuration parameters of modulation scheme, spreading factor (SF), and transmission time interval (TTI) used for a Forward Access Channel (FACH) in the S-CCPCH; and
   receiving after the minimum period of time, from the network, further downlink data on the transport channel.

9. A method for communicating between a network and a mobile terminal in a wireless communication system, the method comprising:
   transmitting, from the network, downlink data on a secondary common control physical channel (S-CCPCH);
   discontinuing the transmitting of the downlink data on the S-CCPCH for a minimum period of time that is determined by configuration parameters of modulation scheme, spreading factor (SF), and transmission time interval (TTI) used for a Forward Access Channel (FACH) in the S-CCPCH; and
   transmitting after the minimum period of time, from the network, further downlink data on the S-CCPCH.

10. The method of claim 9, wherein the S-CCPCH is a physical channel on which a transport channel is mapped.

11. The method of claim 9, wherein the minimum period of time is a number of transmission time intervals between a first transmission on the S-CCPCH and a next transmission on the S-CCPCH.

12. The method of claim 9, wherein the minimum period of time is a number of transmission time intervals between a beginning of a first transmission time interval in which the S-CCPCH is transmitted and a beginning of a next transmission time interval in which the S-CCPCH is transmitted.

13. The method of claim 9, wherein the configuration parameters are related to the S-CCPCH.

14. The method of claim 9, further comprising transmitting an amount of the TTIs to the mobile terminal.

15. The method of claim 14, wherein the amount of TTIs used is transmitted to the mobile terminal via at least one of:
   a point-to-multipoint control channel; and
   a dedicated signal.

16. A mobile terminal for communicating with a network in a wireless communication system, the mobile terminal comprising:
   a transmitter configured to transmit uplink data to the network;
   a receiver configured to receive, from the network, downlink data on a secondary common control physical channel (S-CCPCH); and
   a processor configured to cause the receiver to discontinue the receiving of the downlink data on the S-CCPCH for a minimum period of time that is determined by configuration parameters of modulation scheme, spreading factor (SF), and transmission time interval (TTI) used for a Forward Access Channel (FACH) in the S-CCPCH; and
   wherein the receiver is further configured to receive after the minimum period of time, from the network, further downlink data on the S-CCPCH.

17. The mobile terminal of claim 16, wherein the S-CCPCH is a physical channel on which a transport channel is mapped.

18. The mobile terminal of claim 16, wherein the minimum period of time is a number of transmission time intervals between a first transmission on the S-CCPCH and a next transmission on the S-CCPCH.

19. The mobile terminal of claim 16, wherein the minimum period of time is a number of transmission time intervals between a beginning of a first transmission time interval in which the S-CCPCH is transmitted and a beginning of a next transmission time interval in which the S-CCPCH is transmitted.

20. A mobile terminal for communicating with a network in a wireless communication system, the mobile terminal comprising:
- a transmitter configured to transmit uplink data to the network
- a receiver configured to receive, from the network, an indicator indicating a transport channel to be received during a transmission time interval and to further receive, from the network, downlink data on the transport channel that is mapped onto a secondary common control physical channel (S-CCPCH); and
- a processor configured to cause the receiver to discontinue the receiving of the downlink data on the transport channel for a minimum period of time that is determined by configuration parameters of modulation scheme, spreading factor (SF), and transmission time interval (TTI) used for a Forward Access Channel (FACH) in the S-CCPCH; and
- wherein the receiver is further configured to receive after the minimum period of time, from the network, further downlink data on the transport channel.

21. An apparatus for communicating with a mobile terminal in a wireless communication system, the apparatus comprising:
- a transmitter configured to transmit downlink data to the mobile terminal on a secondary common control physical channel (S-CCPCH); and
- a processor configured to cause the transmitter to discontinue the transmitting of the downlink data on the S-CCPCH for a minimum period of time that is determined by configuration parameters of modulation scheme, spreading factor (SF), and transmission time interval (TTI) used for a Forward Access Channel (FACH) in the S-CCPCH; and
- wherein the transmitter is further configured to transmit to the mobile terminal after the minimum period of time further downlink data on the S-CCPCH.

22. The apparatus of claim 21, wherein the S-CCPCH is a physical channel on which a transport channel is mapped.

23. The apparatus of claim 21, wherein the minimum period of time is a number of transmission time intervals between a first transmission on the S-CCPCH and a next transmission on the S-CCPCH.

24. The apparatus of claim 21, wherein the minimum period of time is a number of transmission time intervals between a beginning of a first transmission time interval in which the S-CCPCH is transmitted and a beginning of a next transmission time interval in which the S-CCPCH is transmitted.

* * * * *